United States Patent
Lee

(10) Patent No.: US 11,764,435 B2
(45) Date of Patent: Sep. 19, 2023

(54) BATTERY MODULE TO WHICH BATTERY CELL PRESSING-TYPE END PLATE AND EXPANDABLE SENSING HOUSING STRUCTURE ARE APPLIED

(71) Applicant: LG CHEM, LTD., Seoul (KR)

(72) Inventor: Bum-Hyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 505 days.

(21) Appl. No.: 16/611,403

(22) PCT Filed: Jul. 23, 2018

(86) PCT No.: PCT/KR2018/008290
§ 371 (c)(1),
(2) Date: Nov. 6, 2019

(87) PCT Pub. No.: WO2019/098491
PCT Pub. Date: May 23, 2019

(65) Prior Publication Data
US 2020/0176745 A1    Jun. 4, 2020

(30) Foreign Application Priority Data
Nov. 14, 2017 (KR) .................. 10-2017-0151589

(51) Int. Cl.
*H01M 50/262* (2021.01)
*H01M 10/48* (2006.01)
(Continued)

(52) U.S. Cl.
CPC ......... *H01M 50/262* (2021.01); *H01M 10/48* (2013.01); *H01M 50/211* (2021.01);
(Continued)

(58) Field of Classification Search
CPC ....... H01M 50/50–502; H01M 50/531; H01M 50/20; H01M 50/262; H01M 50/569;
(Continued)

(56) References Cited

U.S. PATENT DOCUMENTS

2011/0287299 A1   11/2011   Kim
2013/0052516 A1   2/2013    Kim
(Continued)

FOREIGN PATENT DOCUMENTS

CN    205609590 U      9/2016
EP    3091593 A1 *    11/2016   .......... H01M 50/116
(Continued)

OTHER PUBLICATIONS

International Search Report (PCT/ISA/210) issued in PCT/KR2018/008290, dated Nov. 21, 2018.
(Continued)

*Primary Examiner* — Cynthia H Kelly
*Assistant Examiner* — Niara Trant
(74) *Attorney, Agent, or Firm* — Birch, Stewart, Kolasch & Birch, LLP

(57) ABSTRACT

A battery module includes a cell assembly having a plurality of pouch-type battery cells whose wide surfaces stand to be stacked in one direction. The battery module includes a pair of buffer pads disposed at both side surfaces of the cell assembly, a top plate and a bottom plate configured to cover a top portion and a bottom portion of the cell assembly, respectively, and a pair of side plates coupled to both ends of the top plate and the bottom plate by clinching or fitting so that the pair of buffer pads and the cell assembly are interposed there between.

16 Claims, 16 Drawing Sheets

(51) Int. Cl.
*H01M 50/242* (2021.01)
*H01M 50/211* (2021.01)
*H01M 50/503* (2021.01)
*H01M 50/569* (2021.01)
*H01M 50/105* (2021.01)

(52) U.S. Cl.
CPC ....... *H01M 50/242* (2021.01); *H01M 50/503* (2021.01); *H01M 50/569* (2021.01); *H01M 50/105* (2021.01)

(58) Field of Classification Search
CPC ............. H01M 50/242; H01M 50/211; H01M 50/503; H01M 10/48; H01M 50/105
See application file for complete search history.

(56) References Cited

U.S. PATENT DOCUMENTS

| | | |
|---|---|---|
| 2013/0164599 A1 | 6/2013 | Kim |
| 2013/0280596 A1 | 10/2013 | Lee et al. |
| 2014/0242429 A1 | 8/2014 | Lee et al. |
| 2016/0133898 A1* | 5/2016 | Choi ............... H01M 10/425 429/151 |
| 2016/0156004 A1 | 6/2016 | Kim et al. |
| 2017/0190264 A1 | 7/2017 | Kim et al. |
| 2017/0194680 A1* | 7/2017 | Muck ............... H01M 10/625 |
| 2017/0309872 A1* | 10/2017 | Kuboki ............ H01M 50/178 |
| 2017/0352850 A1* | 12/2017 | Nagane ............ H01M 50/20 |
| 2018/0048033 A1 | 2/2018 | Lee et al. |
| 2018/0108881 A1 | 4/2018 | Jin et al. |
| 2018/0151859 A1* | 5/2018 | Aizawa ............ H01M 50/502 |
| 2018/0175343 A1* | 6/2018 | Choi ............... B60L 50/64 |
| 2019/0081292 A1* | 3/2019 | Shimizu ........... H01M 50/502 |
| 2019/0334138 A1* | 10/2019 | Song ............... H01M 50/55 |

FOREIGN PATENT DOCUMENTS

| | | |
|---|---|---|
| EP | 3309866 A1 | 4/2018 |
| JP | 2012-181970 A | 9/2012 |
| JP | 2012-248374 A | 12/2012 |
| JP | 2016-514344 A | 5/2016 |
| JP | 2016-225136 A | 12/2016 |
| KR | 10-2008-0032287 A | 4/2008 |
| KR | 10-2011-0128593 A | 11/2011 |
| KR | 10-1292984 B1 | 8/2013 |
| KR | 10-2017-0043933 A | 4/2014 |
| KR | 10-2014-0080341 A | 6/2014 |
| KR | 10-2014-0084487 A | 7/2014 |
| KR | 10-1447062 B | 11/2014 |
| KR | 10-2016-0132146 A | 11/2016 |
| KR | 10-2016-0133245 A | 11/2016 |
| KR | 10-2017-0067007 A | 6/2017 |
| KR | 10-2017-0082041 A | 7/2017 |
| KR | 10-1783917 B1 | 10/2017 |
| WO | WO 2012/091509 A2 | 7/2012 |
| WO | WO 2016/204470 A1 | 12/2016 |

OTHER PUBLICATIONS

Extended European Search Report, dated May 19, 2020, for European Application No. 18879466.3.

* cited by examiner

BATTERY MODULE TO WHICH BATTERY CELL PRESSING-TYPE END PLATE AND EXPANDABLE SENSING HOUSING STRUCTURE ARE APPLIED

TECHNICAL FIELD

The present disclosure relates to a battery module, and more particularly, to a battery module having end plates for pressurizing battery cells in the battery module and capable of packaging the battery cells and a sensing housing structure extendible according to the number of battery cells.

The present application claims priority to Korean Patent Application No. 10-2017-0151589 filed on Nov. 14, 2017 in the Republic of Korea, the disclosures of which are incorporated herein by reference.

BACKGROUND ART

Recently, secondary batteries have been widely applied not only to portable devices but also to electric vehicles (EV), hybrid electric vehicles (HEV), electric energy storage systems (ESS) and the like driven by electric driving sources.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

When a plurality of secondary battery cells are connected in series and/or in parallel to constitute a battery pack, generally, a battery module including a cell assembly, which is an aggregate of a plurality of secondary battery cells, end plates for fixing the cell assembly protecting the cell assembly against external impacts, and a sensing housing for electrical connection of the secondary battery cells is configured first, and then a battery pack is constructed using at least one battery module by adding other components thereto. Here, the secondary battery cells of the battery module or the battery pack may be generally pouch-type secondary batteries, which are capable of being easily stacked.

In case of a lithium-polymer pouch-type secondary battery, which is frequently used recently, the internal electrolyte may be decomposed due to a side reaction of repeated charging and discharging to generate gas. At this time, the external shape of the secondary battery cell may be deformed by the generated gas, which is called a 'swelling phenomenon'.

If the swelling phenomenon occurs at the secondary battery cell, the external shape of the battery module may be changed due to the pressure caused by the volume expansion. The external shape may affect the safety of the battery module itself and the stability of other neighboring devices, and thus it is needed to prevent the swelling phenomenon. For example, in the conventional art, a strap is wound around the end plates to press the battery module. However, in this case, only the portion wrapped with the strap is mainly pressed, and the other portion is relatively not pressed.

Meanwhile, in the conventional battery module, a sensing assembly generally has a single housing structure and covers the protruding portion of electrode leads of the secondary battery cells.

In case of the conventional sensing assembly having a single housing structure, if the total size of the battery module is changed by increasing or decreasing the number of secondary battery cells stacked on each other according to the varied capacity of the battery module or the battery pack, the housing structure should be redesigned suitable for the changed size.

DISCLOSURE

Technical Problem

The present disclosure is designed to solve the problems of the related art, and therefore the present disclosure is directed to providing a battery module, which includes end plates capable of protecting battery cells located in the battery module from the outside and pressing the battery cells with a uniform pressure and a sensing assembly that is simply and easily extensible.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, which includes a cell assembly comprising a plurality of pouch-type battery cells having side surfaces stacked in one direction, a pair of buffer pads, one of the pairs of buffer pads disposed at each side surface of the cell assembly; a top plate and a bottom plate configured to cover a top and a bottom of the cell assembly, respectively; and a pair of side plates coupled to both ends of the top plate and the bottom plate by clinching or fitting so that the pair of buffer pads and the cell assembly are interposed between the pair of side plates.

Each of the pair of side plates may include a bead portion depressed by a predetermined depth, and each of the pair of buffer pads may have one surface with a shape corresponding to the bead portion.

The bead portion may include a first bead portion provided at a center region of the side plate and a second bead portion separately provided at a left side region and a right side region of the side plate with respect to the first bead portion and having a smaller area and a smaller depth than the first bead portion.

Each of the top plate and the bottom plate may include a horizontal portion forming a horizontal surface and vertical portions bent vertically at both sides of the horizontal portion, and an edge region of a top end and an edge region of a bottom end of each of the pair of side plates may be coupled to the vertical portion of the top plate and the vertical portion of the bottom plate by clinching, respectively.

Each of the pair of side plates may have clinching protrusions protruding at the edge region of the top end and the edge region of the bottom end, and the top plate and the bottom plate may each have clinching holes formed at the vertical portions coupled with the clinching protrusions by fitting.

The edge region of the top end and the edge region of the bottom end of each of the pair of side plates may be disposed to overlap at an inner side of the vertical portion of the top plate and the vertical portion of the bottom plate, respectively.

The battery module may further comprise a sensing assembly disposed to at least one of a front surface and a rear surface of the cell assembly to electrically connect electrode leads protruding at each of the pouch-type battery cells, and the sensing assembly may include a bus bar electrically connected to the electrode leads; and a sensing housing having a front surface to which the bus bar is mounted, the sensing housing including a plurality of sensing housing parts that are detachable from each other and successively assembled in one direction and allow the electrode leads to pass through a body of the sensing housing toward the bus bar.

The plurality of sensing housing parts may be provided in a number corresponding to a number of the pouch-type battery cells.

Each of plurality of sensing housing parts may have a convex protrusion and a concave groove corresponding to each other and are mutually assembled by fitting in a block coupling manner.

The sensing housing may be fit into one side end of each of the pair of side plates, and be supported by the pair of side plates to be spaced apart from the plurality of pouch-type battery cells by a predetermined distance.

The bus bar may include a plate portion having a plate form contacted to the electrode leads and a terminal bending portion bent from one end of the plate portion, and the sensing housing may have a slit through which at least a part of the bus bar passes and a slot forming an inner space for accommodating the terminal bending portion, the slit and the slot being formed by assembling a first sensing housing part and a second sensing housing part.

The sensing assembly may further include a voltage sensing receptacle terminal inserted into the slot and provided to be electrically connectable to the terminal bending portion of the bus bar.

A nut may be accommodated in any one of the slots provided in the sensing housing, and the sensing assembly may further include an external power connection member fixed by a bolt fastened to the nut.

Each of the top plate and the bottom plate may include a horizontal portion forming a horizontal surface, vertical portions bent vertically at both ends of the horizontal portion, and insert portions bent at ends of the vertical portions toward the cell assembly, and each of the pair of side plates may have a plate hole formed at an edge region of a top end and an edge region of a bottom end thereof so that the insert portion is fit therein.

Each of buffer pads may have a thickness determined by the following equation T=A/2+B, where T: thickness of the buffer pad, A: the number of battery cells×maximum displacement of the battery cells at swelling, B: thickness of the buffer pad at maximum compression.

The battery module according to the present disclosure as described above may be applied to a battery pack or a power storage device, which includes at least one battery module.

Advantageous Effects

According to an embodiment of the present disclosure, it is possible to provide a battery module, which ensures convenient assembling and includes end plates capable of pressing the battery cells with a uniform pressure.

In addition, according to another embodiment of the present disclosure, it is possible to provide a battery module, which includes a sensing assembly that is simply and easily extensible. The sensing assembly has extensibility and also allows easy assembling and connection with other components such as bus bars.

The effects of the present disclosure are not limited to the above, and effects not mentioned therein may be clearly understood from the present specification and the accompanying drawings by those skilled in the art.

BEST MODE

Figure 1:
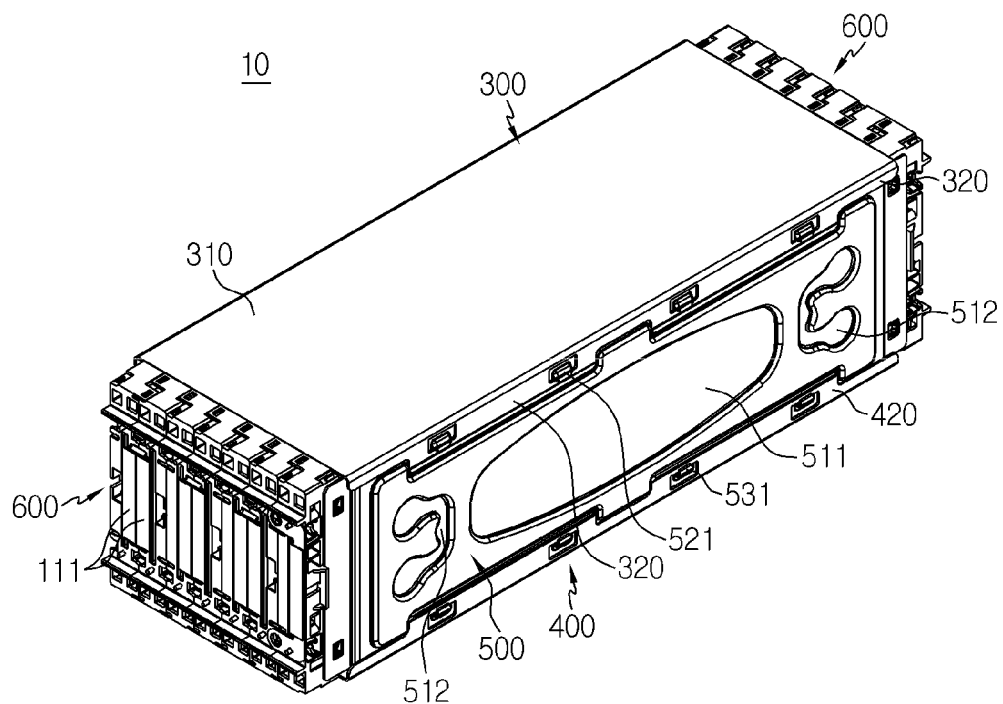
FIG. 1 is a perspective view schematically showing a battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Since the embodiments disclosed herein are provided for more perfect explanation of the present disclosure, the shape, size and the like of components may be exaggerated, omitted or simplified in the drawings for better understanding. Thus, the size and ratio of components in the drawings do not wholly reflect the actual size and ratio.

Figure 2:
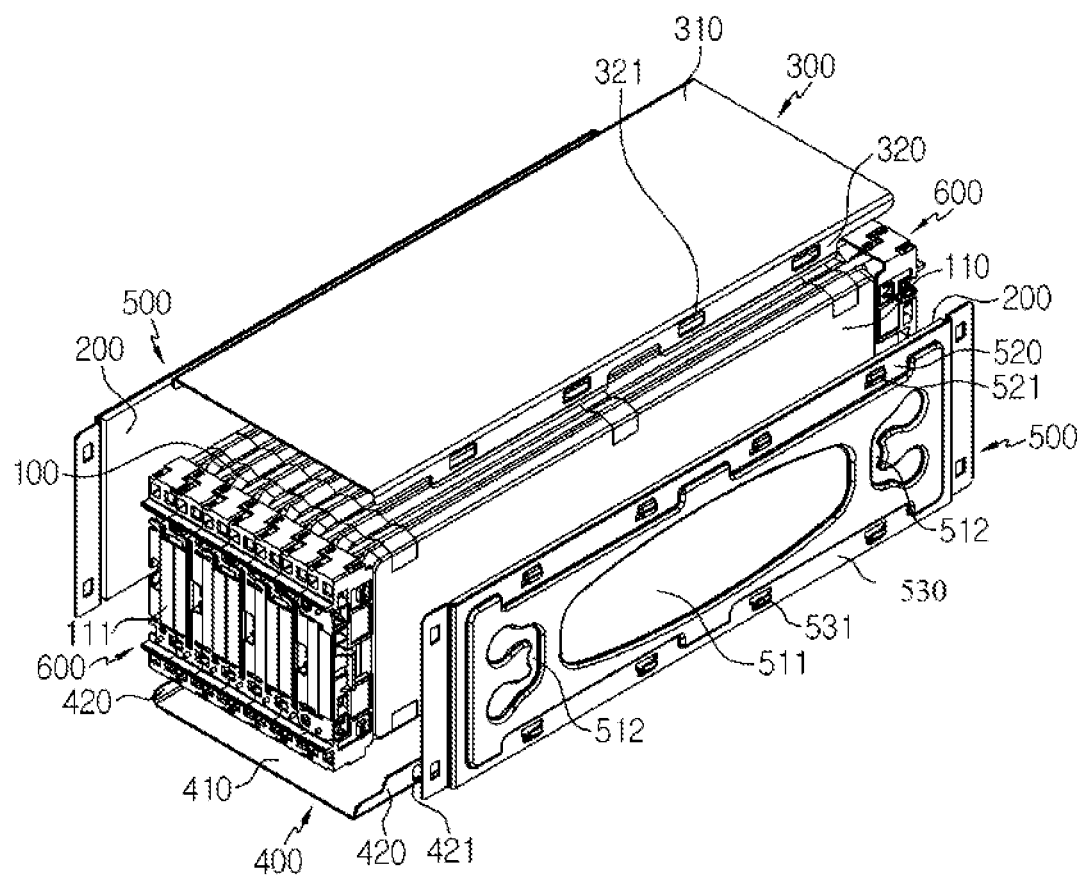
FIGS. 2 and 3 are partially exploded perspective views of FIG. 1.
Figure 3:
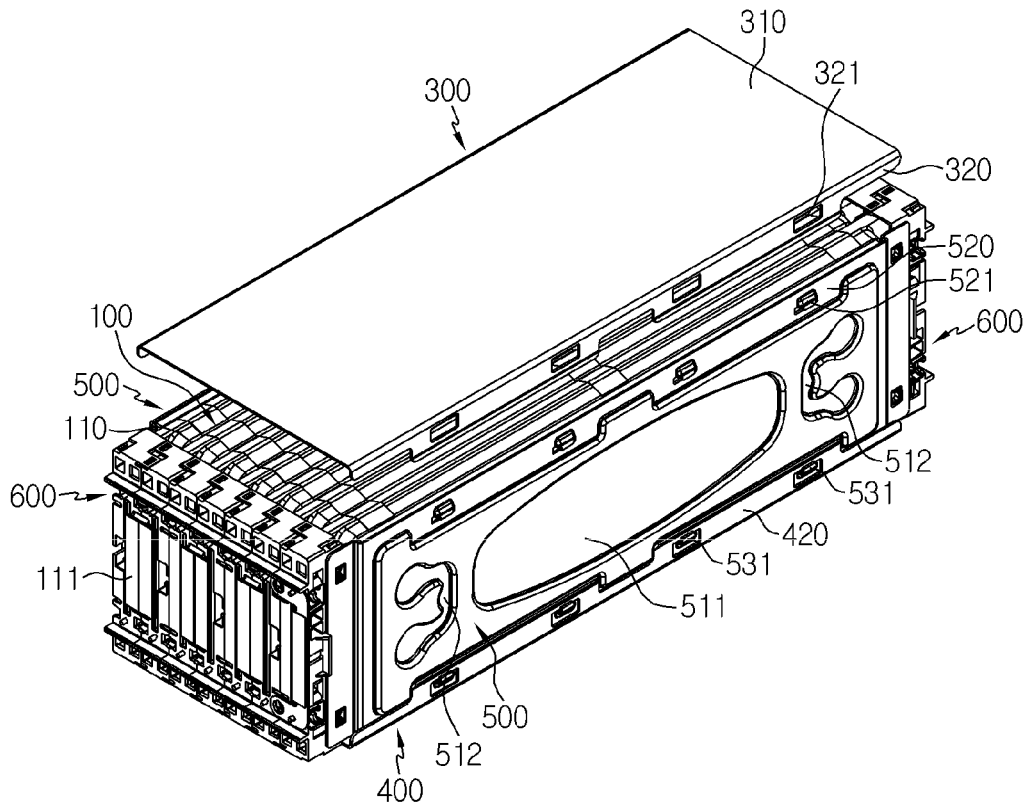
Figure 4:
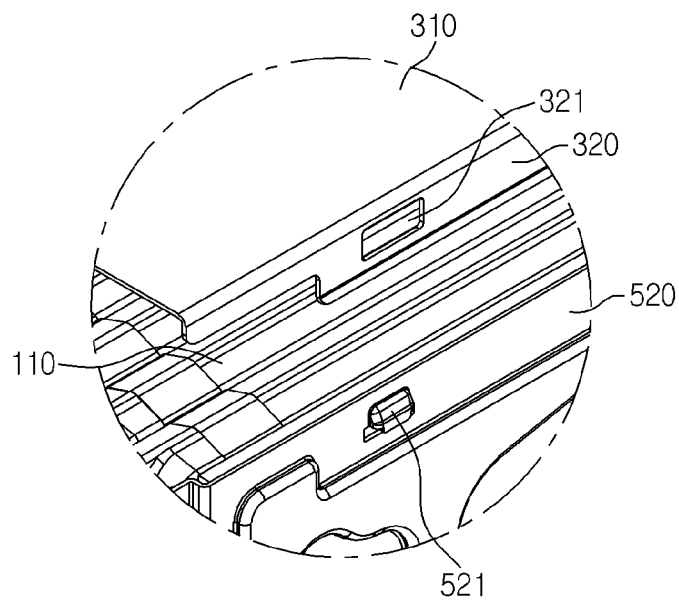
FIG. 4 is a partially enlarged view of FIG. 3.
Figure 5:
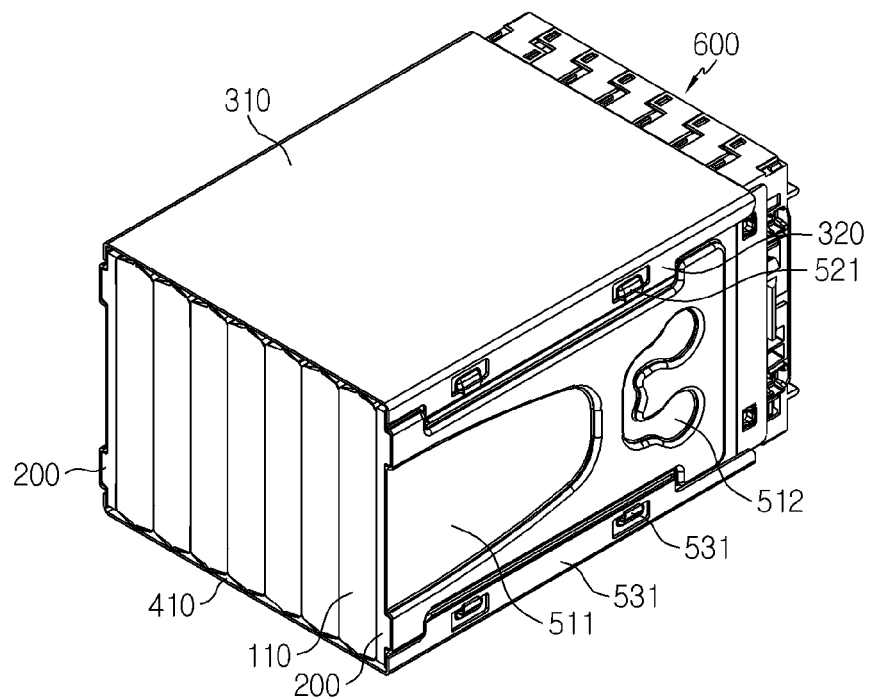
FIG. 5 is a perspective view showing the battery module that is sectioned in a longitudinal direction.

FIG. 1 is a perspective view schematically showing a battery module according to an embodiment of the present disclosure, FIGS. 2 and 3 are partially exploded perspective views of FIG. 1, FIG. 4 is a partially enlarged view of FIG. 3, and FIG. 5 is a perspective view showing the battery module that is sectioned in a longitudinal direction.

Referring to FIGS. 1 to 5, a battery module 10 according to an embodiment of the present disclosure includes a cell assembly 100, a pair of buffer pads 200, a top plate 300, a bottom plate 400, and a pair of side plates 500.

The cell assembly 100 of the battery module 10 will be briefly described. The cell assembly 100 may be an aggregate of a plurality of pouch-type battery cells 110. The pouch-type battery cells 110 are provided such that their wide surfaces stand perpendicular to the ground, and thus may be stacked in a horizontal direction. For example, in this embodiment, the cell assembly 100 is configured using seven pouch-type battery cells 110, but the number of pouch-type battery cells 110 is variable depending on the output or capacity required for the battery module 10. The number of pouch-type battery cells 110 included in the cell assembly 100 may be lower than seven or equal to or greater than eight.

Here, the pouch-type battery cell 110 may include a pouch exterior, and an electrode assembly and an electrolyte provided to be accommodated in the pouch exterior.

The pouch exterior may include two pouches, at least one of which may have a concave inner space. Also, the electrode assembly may be accommodated in the inner space of the pouch. The peripheries of two pouches are fused together so that the inner space accommodating the electrode assembly may be sealed. An electrode lead 111 may be attached to the electrode assembly, and the electrode lead 111 may be interposed between the fused portions of the pouch exterior and exposed to the outside of the pouch exterior to function as an electrode terminal of the battery cell 110.

A pair of buffer pads 200 may be disposed at both sides of the cell assembly 100. The buffer pad 200 may be made of an elastic and insulating material that absorbs expansion pressure and external impact upon swelling of the pouch-type battery cells 110 according to charging/discharging. For example, the buffer pad 200 may be made of an expanded polypropylene (EPP) or an ethylene-vinyl acetate copolymer (EVA) in the form of a foam having a size facing the wide surface of the pouch-type battery cell 110.

More specifically, as shown in FIG. 2, the buffer pad 200 is interposed between the cell assembly 100 and the side plate 500 so that one side of the buffer pad 200 faces the pouch-type battery cell 110 disposed at an outermost side in the cell assembly 100, and the other side of the buffer pad 200 is faces the side plate 500. As described above, since the buffer pad 200 is disposed only at the outermost side of the cell assembly 100, the battery module 10 of the present disclosure may have an increased energy density per unit area compared with the case where buffer pads 200 are respectively interposed between battery cells 110. Preferably, the cell assembly 100 of the present disclosure has a structure in which there is no gap between the battery cells 110, or the battery cells 110 are disposed in a spatially intensive manner with only a double-sided tape being interposed between the battery cells 110.

Since the cell assembly 100 is pressed by the side plate 500, explained later, a compressive stress is applied to the pouch-type battery cell 110 located at the outermost side in a highest level. Thus, as in this embodiment, as the buffer pad 200 is interposed at a border surface where the expansion force of the pouch-type battery cells 110 confronts the pressing force of the side plate 500, the pressing force of the side plate 500 and the expansion force of the pouch-type battery cells 110 may be uniformly dispersed to prevent the side plate 500 and the battery cells 110 from being damaged.

Meanwhile, as the buffer pad 200 is thicker, the pressing force of the side plate 500 or the expansion force of the battery cells 110 is effectively dispersed, and thus the stress level acting on the battery cells 110 or the side plate 500 may be reduced. However, if the buffer pad 200 is excessively thick, it is undesirable in terms of the energy density of the battery module 10. Thus, the thickness of the buffer pad 200 according to the present disclosure may be determined by the following equation.

$$T=A/2+B$$

(T: thickness of the buffer pad 200, A: the number of battery cells 110×maximum displacement of the battery cells 110 at swelling, B: thickness of the buffer pad 200 at maximum compression)

In other words, two buffer pads 200 of the present disclosure are provided in a pair and disposed at both sides of the cell assembly 100, respectively, so that the deformation of the entire battery cells 110 at swelling may be absorbed dividedly. Thus, in the equation for calculating the thickness of the buffer pad 200, the variable A/2 is set as the maximum deformation amount by which the buffer pad 200 may be compressed, so that each buffer pad 200 may absorb ½ of the maximum deformation amount during the swelling of all the battery cells 110.

In the present disclosure, by calculating the thickness of the buffer pad 200 as described above, the buffer pad 200 may be configured to have a minimum thickness within the range of giving a meaningful effect to increase the energy density.

The top and bottom plates 300, 400 and the pair of side plates 500 may be formed in a plate shape having a predetermined area and may be disposed at upper and lower sides and both sides of the cell assembly 100 to cover an upper portion, a lower portion, a left surface and a right surface of the cell assembly 100, respectively. The top and bottom plates 300, 400 and the pair of side plates 500 are generally called end plates, which cover the outer portion of the cell assembly 100.

The top and bottom plates 300, 400 and the pair of side plates 500 may give mechanical support for the cell assembly 100 and protect the cell assembly 100 from external impacts. Thus, the top and bottom plates 300, 400 and the pair of side plates 500 may be made of metal material such as steel to ensure rigidity.

The pair of side plates 500 according to the present disclosure are configured to be assembled with the top and bottom plates 300, and 400 with the cell assembly 100 and the buffer pad 200 being interposed between the pair of side plates 500. For example, the top and bottom plates 300, 400 and the pair of side plates 500 may be assembled together to form a tube form.

In particular, the pair of side plates 500 may be provided to be pressed into both ends of the top and bottom plates 300, 400 with the pair of buffer pads and the cell assembly being interposed between the pair of side plates 500.

The assembling configuration of the present disclosure will be described in detail with reference to FIGS. 1 to 4. The top and bottom plates 300, 400 may include horizontal portions 310, 410 forming a horizontal surface and vertical portions 320, 420 vertically bent at both ends of the horizontal portions 310, 410, respectively. In addition, the pair of side plates 500 may have edge regions 520, 530 at the top and bottom ends, which are coupled to the vertical portions 320, 420 of the top and bottom plates 300, 400 by clinching or fitting, respectively.

More specifically, clinching protrusions 521, 531 protruding outwardly are provided at the edge regions 520 and 530 of the top and bottom ends of the side plate 500, and clinching holes 321, 421 fit into the clinching protrusions 521, 531 are provided at the vertical portions 320, 420 of the top and bottom plates 300, 400.

In a state where the edge regions 520, 530 of the top and bottom ends of the side plate 500 are disposed to overlap at an inner side of the vertical portions 320, 420 of the top and bottom plates 300, 400, if the clinching holes 321, 421 are pressed into the clinching protrusions 521, 531, the side plate 500 may be fixed to the top and bottom plates 300, 400.

Referring to FIG. 3, two points of the bottom edge region 530 of the left and right side plates 500 are integrally coupled between the vertical portions 420, 420 of the bottom plate 400 by clinching, and two points of the top edge region 520 of the left and right side plates 500 are integrally coupled between the vertical portions 320, 320 of the top plate 300 by clinching.

In this case, the gap between the vertical portions 320, 420 of the top and bottom plates 300, 400 corresponds to a lateral width of the cell assembly 100. Thus, when the top and bottom plates 300, 400 and the left and right side plates 500 are coupled by clinching as described above, the left and right side plates 500 are confined at the inner side of the vertical portions 320, 420 of the top and bottom plates 300, 400, thereby pressing the buffer pad 200 and the battery cells 110 by the left and right side plates 500. At this time, the pressing force applied by the side plate 500 may be uniformly transferred to the cell assembly 100 through the buffer pad 200.

In addition, the pair of side plates 500 may have a bead portion depressed from the plate surface by a predetermined depth, and the pair of buffer pads 200 may have a facing surface shaped corresponding to the bead portion.

The bead portion may have a concave shape, when the side plate 500 is observed from the outside. When the battery cells 110 swell, the bead portion gives a mechanical rigidity against the expansion force to the side plate 500, thereby preventing the side plate 500 from being bent or distorted.

In this embodiment, the bead portion may include a first bead portion 511 provided in a center region of the side plate 500 and a second bead portion 512 separately provided at left and right side regions with respect to the first bead portion 511.

For example, as shown in FIGS. 2 to 3, the first bead portion 511 may be widely distributed in the center region of the side plate 500. In other words, when the side plate 500 is divided into five parts along the length direction of the battery module 10, the first bead portion 511 may be formed in a center region corresponding to three central parts. The first bead portion 511 corresponds to a center region where deformation is greatest when the battery cell 110 swells.

In addition, the second bead portion 512 may be separately formed at left and right sides of the first bead portion 511 in a symmetrical form. The second bead portion 512 may have smaller area and depth than the first bead portion 511. In other words, the first bead portion 511 facing the center region that is expanded most when the battery cell 110 swells may be formed wider and deeper than the second bead portion 512.

Due to the bead portion of the present disclosure, when the battery cells 110 swells, the pressing force is applied more strongly to the center region of the side plate 500, thereby preventing the battery cells 110 from being expanded more effectively.

Meanwhile, the battery module 10 according to the present disclosure may further include a sensing assembly 600 disposed to at least one of a front surface and a rear surface of the cell assembly 100 to electrically connect the pouch-type battery cells 110.

For reference, the pouch-type battery cells 110 may be classified into unidirectional cells and bidirectional cells depending on the protruding direction of the electrode lead 111. In this embodiment, bidirectional pouch-type battery cells 110 are used (see FIG. 1), and thus sensing assembly 600 is configured to be mounted to the front surface and the rear surface of the cell assembly 100. In other words, if the battery module 10 is configured with unidirectional pouch-type battery cells 110, different from this embodiment, the sensing assembly 600 may be mounted to any one of the front surface and the rear surface of the cell assembly 100.

Figure 6:
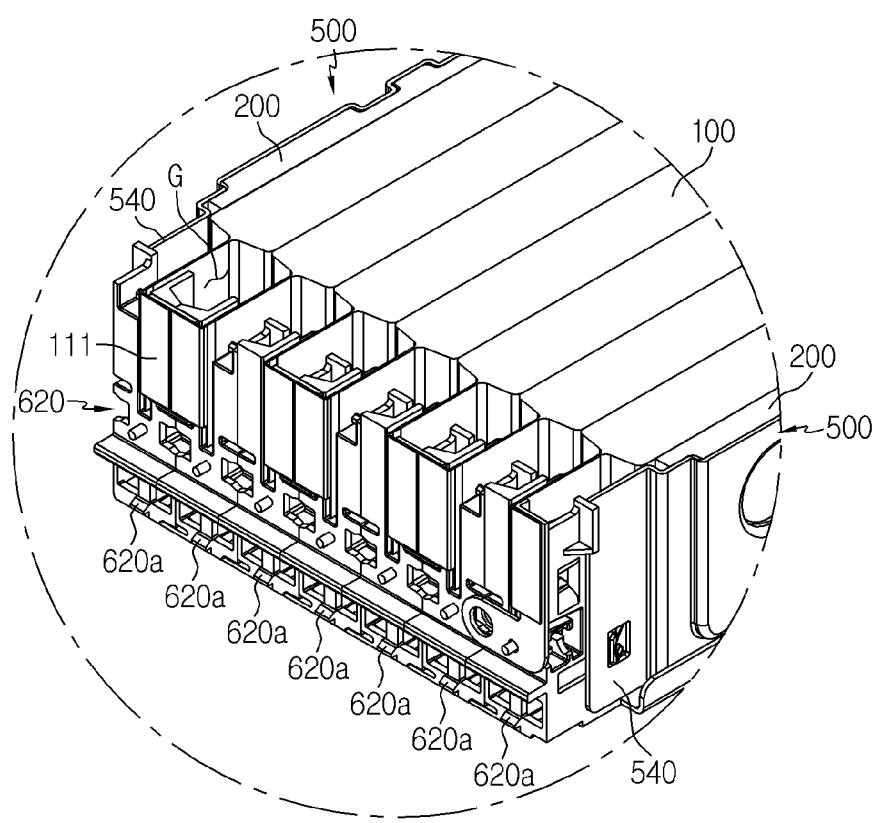
FIG. 6 is a partial perspective view showing the battery module that is sectioned in a lateral direction.
Figure 7:
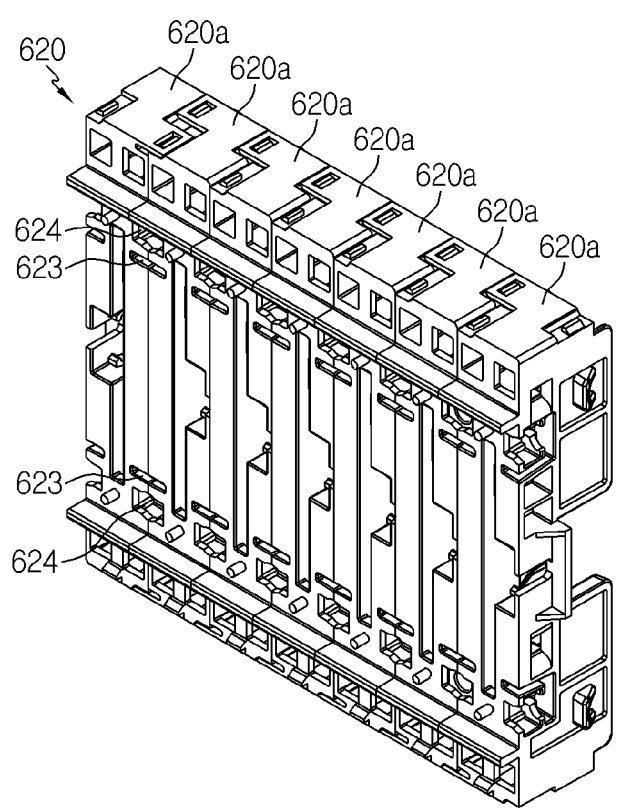
FIG. 7 is a perspective view showing a sensing housing according to an embodiment of the present disclosure.
Figure 8:
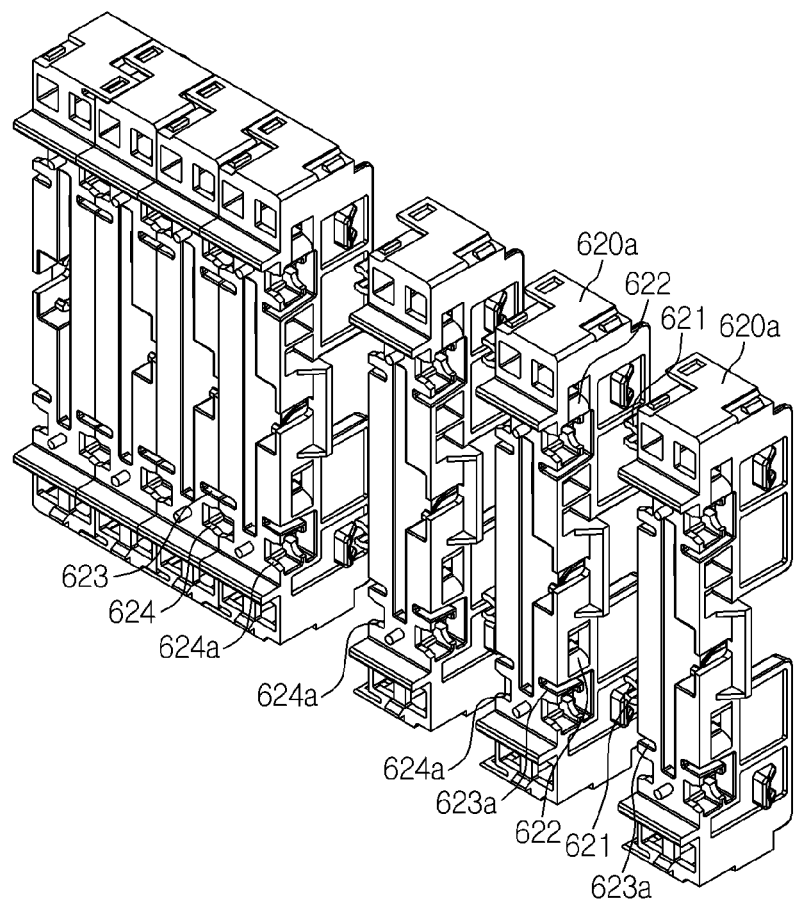
FIG. 8 is a partially exploded perspective view showing the sensing housing of FIG. 7.
Figure 9:
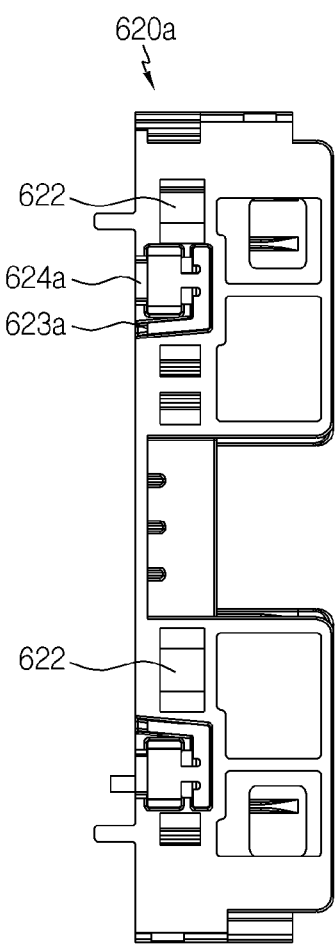
FIGS. 9 and 10 are a right view and a front view showing the sensing housing part, respectively.
Figure 10:
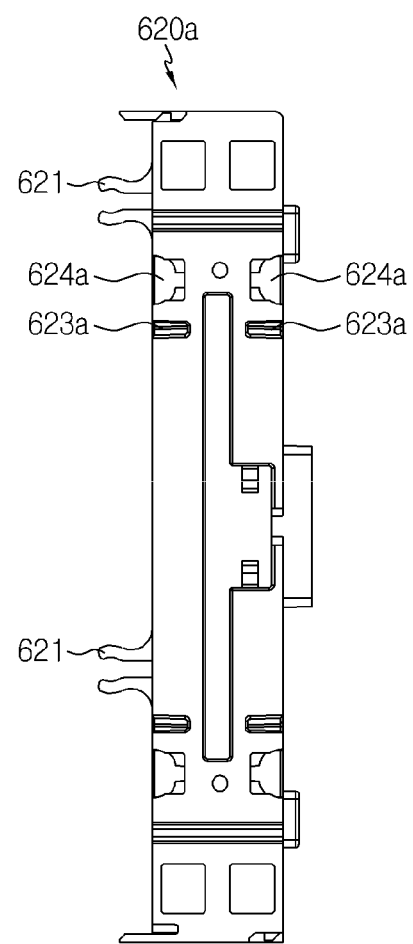
Figure 11:
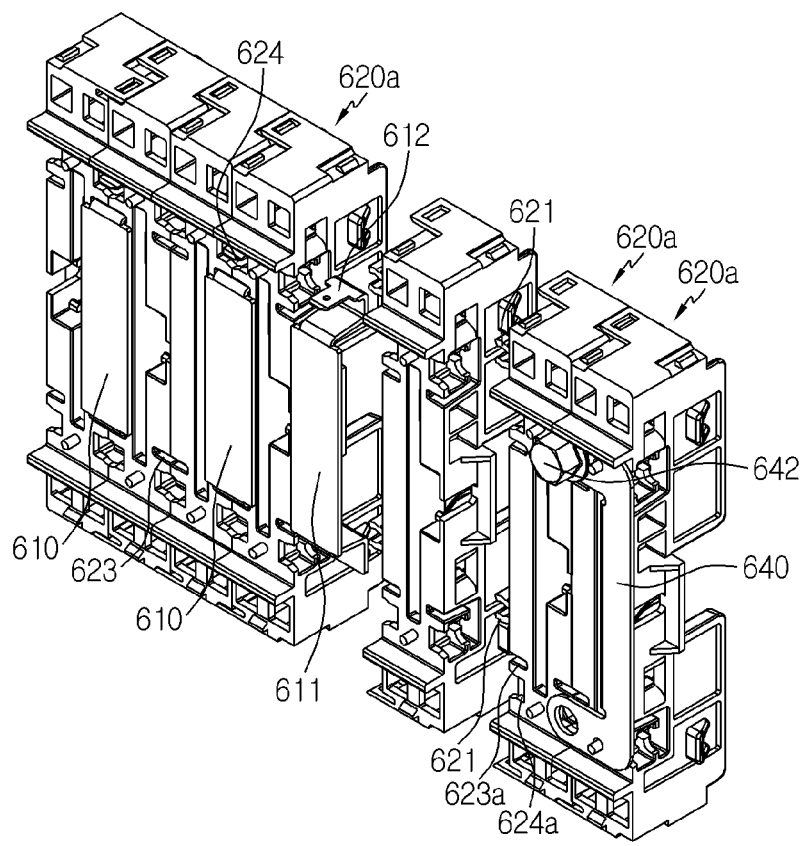
FIG. 11 is a diagram for illustrating a process of assembling the sensing housing parts with a bus bar according to an embodiment of the present disclosure.

FIG. 6 is a partial perspective view showing the battery module that is sectioned in a lateral direction, FIG. 7 is a perspective view showing a sensing housing according to an embodiment of the present disclosure, FIG. 8 is a partially exploded perspective view showing the sensing housing of FIG. 7, FIGS. 9 and 10 are a right view and a front view showing the sensing housing part, respectively, and FIG. 11 is a diagram for illustrating a process of assembling the sensing housing parts with a bus bar according to an embodiment of the present disclosure.

Referring to FIGS. 6 to 11, the sensing assembly 600 may include a plurality of bus bars 610 and a sensing housing 620 in order to electrically connect the plurality of battery cells 110 and sense voltage thereof.

The bus bar 610 may be coupled to the electrode leads 111 by welding or the like so as to be electrically connected to the electrode leads 111 of the plurality of battery cells 110.

The sensing housing 620 gives a place where various components such as the bus bar 610 may be installed and plays a role of covering the front surface and the rear surface of the cell assembly 100. The bus bar 610 may be mounted to a front surface of the sensing housing 620, and the electrode leads 111 of the battery cells 110 may be welded to the bus bar 610 through a body of the sensing housing 620.

As shown in FIG. 6, the sensing housing 620 may be fit into one end 540 of the pair of side plates 500, respectively, and be supported by the pair of side plates 500 to be spaced apart from the plurality of pouch-type battery cells 110 by a predetermined distance. Accordingly, a predetermined empty space G may be formed between the sensing housing 620 and the plurality of pouch-type battery cells 110.

Since the sensing housing 620 is supported by the side plate 500 to maintain a constant distance from the battery cells as described above even though an external impact is applied thereto, the electric connection between the bus bars 610 and the electrode leads 111 may be safely secured. In addition, the empty space G may be utilized as a space for collecting gas that may be generated when the pouch-type battery cells 110 swell. If gas is filled in a closed space in case of emergency, the pressure may be greatly increased to raise the risk of explosion. However, if the gas collecting space is provided as this embodiment, it is possible to prevent the pressure of the battery module 10 from abruptly increasing.

In particular, as shown in FIGS. 7 and 8, the sensing housing 620 of the present disclosure may include unit sensing housing parts 620a that may be detachable from each other and be assembled successively in one direction. The unit sensing housing parts 620a are provided in a number corresponding to the number of the pouch-type battery cells 110 and may respectively have a convex protrusion 621 and a concave groove 622 corresponding to each other so as to be assembled by fitting in a block coupling manner.

For example, as shown in FIGS. 8 to 10, the unit sensing housing part 620a may have a convex protrusion 621 at its left surface and a concave groove 622 at its right surface opposite to the left surface. In this configuration, if a left surface of any one unit sensing housing part 620a is closely adhered to a right surface of another unit sensing housing part 620a, the convex protrusion 621 is fit into the concave groove 622, and the left surface of any one unit sensing housing part 620a and the right surface of another sensing housing part 620a may be assembled in contact with each other. In the same pattern, still another unit sensing housing part 620a may be additionally assembled to the already assembled sensing housing part 620a to configure a single sensing housing 620.

If the sensing housing parts 620a of the present disclosure are used, even though the number of the battery cells 110 of the battery module 10 varies according to a desired capacity or overall size, a suitable sensing housing 620 may be implemented just by adjusting the number of the sensing housing parts 620a to correspond to the number of the battery cells 110, without designing a new housing structure separately. In other words, the sensing housing 620 according to the present disclosure may have convenient and easy extensibility by assembling the unit sensing housing parts 620a.

Meanwhile, as shown in FIG. 11, the bus bar 610 according to the present disclosure may include a plate portion 611 having a plate form to which the electrode leads 111 is contacted, and a terminal bending portion 612 having a bent form with a "U" shape on at least one end of the plate portion 611.

The bus bars 610 may be assembled and fixed to the sensing housing parts 620a without any separate fastening component. For this, the sensing housing 620 may further have slits 623 formed by assembling any one sensing housing part 620a with another sensing housing part 620a and allowing the bus bar 610 to partially pass therethrough, and slots 624 forming an inner space for accommodating the terminal bending portion 612 of the bus bar 610.

Referring to FIGS. 9 to 11 together, the unit sensing housing part 620a includes a first cut portion 623a formed by cutting the left surface and the right surface as much as a thickness of the bus bar 610 and a second cut portion 624a formed by partially cut the left surface and the right surface at a location adjacent to the first cut portion 623a as much as a size corresponding to the width of the terminal bending portion 612. The slit 623 and the slot 624 of the sensing housing 620 are formed as two facing first cut portions 623a and two facing second cut portions 624a come into contact with each other when the unit sensing housing parts 620a are assembled.

The assembling configuration of the sensing housing 620 and the bus bar 610 will be described. First, the bus bar 610 is mounted to the right surface of any one sensing housing part 620a in a lateral direction. At this time, a portion of the bus bar 610, which is bent and extended from the plate portion 611, may be partially inserted into the first cut portion 623a in a lateral direction, and also the terminal bending portion 612 may also be partially inserted into the second cut portion 624a in a lateral direction. In this state, the left surface of any one sensing housing part 620a is assembled to the right surface of another sensing housing part 620a. At this time, the portion bent and extended from the plate portion 611 and another portion of the terminal bending portion 612 may be inserted into the first cut portion 623a and the second cut portion 624a of another sensing housing part 620a, respectively. Accordingly, the bus bar 610 is confined between the sensing housing parts 620a, the plate portion 611 of the bus bar 610 is exposed to the front surface of the sensing housing 620, and the terminal bending portion 612 is accommodated in the inner space of the slot 624.

Figure 12:
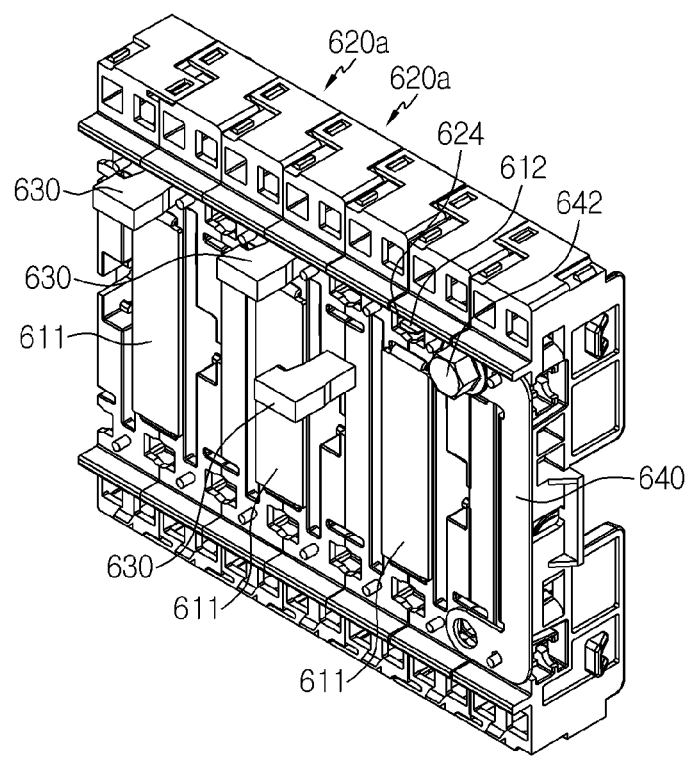
FIGS. 12 and 13 are diagrams showing a state before and after a voltage sensing receptacle terminal is coupled to the sensing assembly according to an embodiment of the present disclosure.
Figure 13:
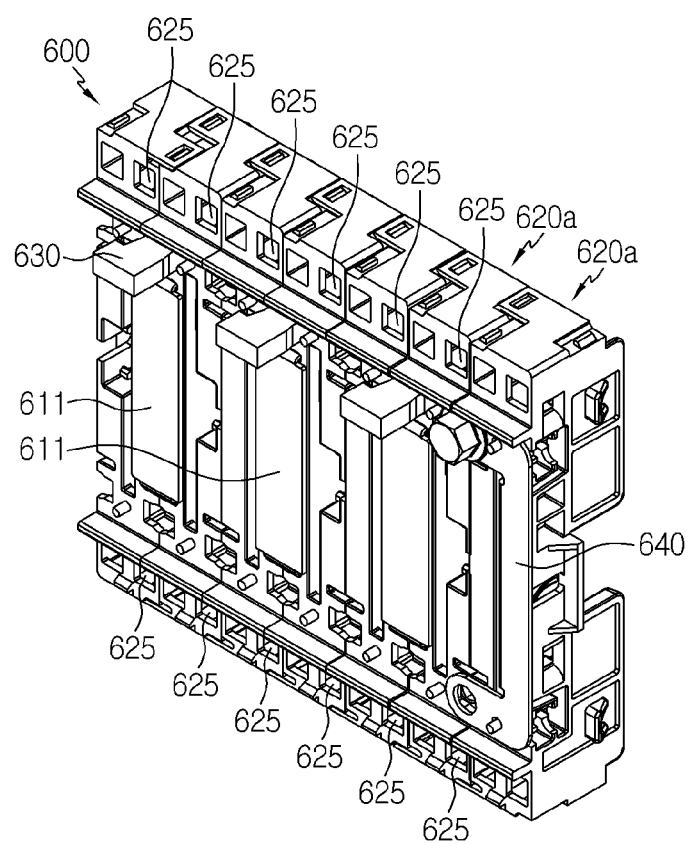

As shown in FIGS. 12 and 13, the terminal bending portion 612 accommodated in the inner space of the slot 624 as described above may be electrically connected to a voltage sensing receptacle terminal 630. The voltage sensing receptacle terminal 630 may be inserted into and released from the slot 624 and connected onto a BMS to serve as a connector for transmitting voltage information of the battery cells 110 to the BMS.

The voltage sensing receptacle terminal 630 is inserted into the slot 624 of the sensing housing 620 and electrically connected to the terminal bending portion 612 of the bus bar 610 to sense voltage of the battery cells 110 and transmit the voltage information to the BMS. If the slot 624 of the sensing housing 620, the terminal bending portion 612 of the bus bar 610 accommodated in the slot 624, and the voltage sensing receptacle terminal 630 provided to be inserted into the slot 624 or released from the slot 624 according to this embodiment are used, it is possible to satisfy both electric stability and convenient connection.

Figure 14:
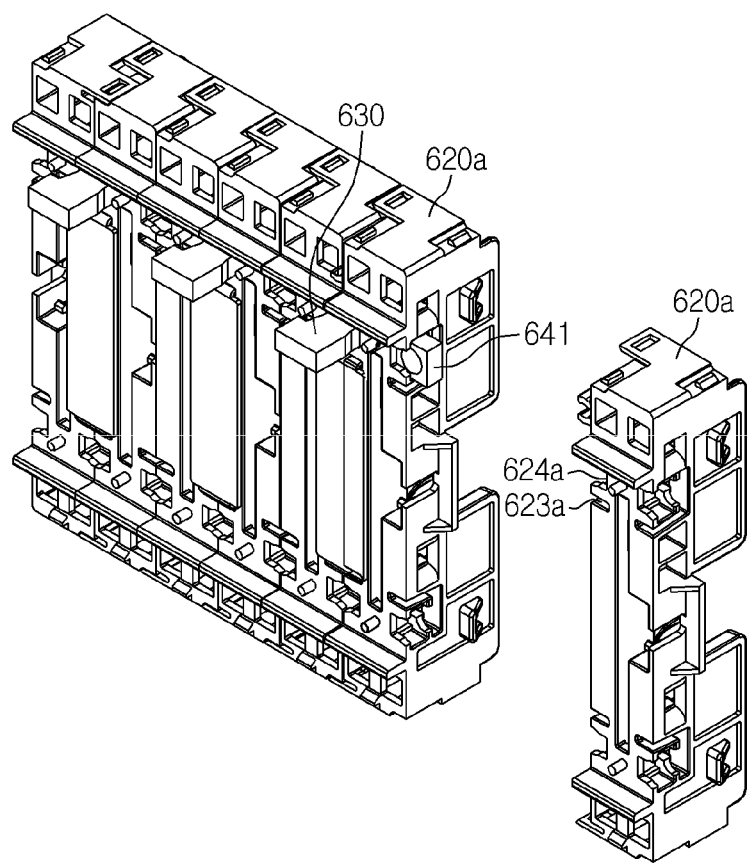
FIGS. 14 and 15 are diagrams for illustrating a process of assembling the sensing housing parts with an external power connection member according to an embodiment of the present disclosure.
Figure 15:
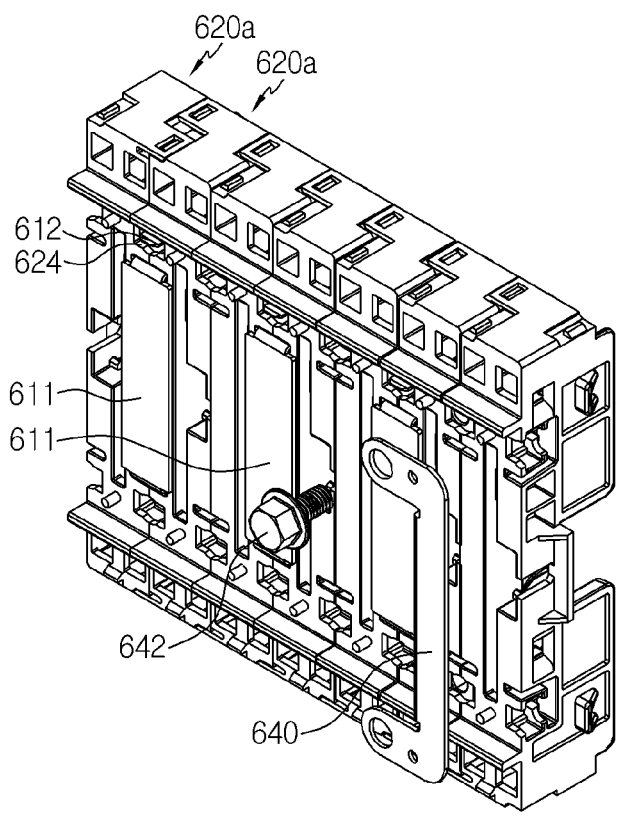

Meanwhile, referring to FIGS. 14 and 15, the sensing assembly 600 may further include a nut accommodated in any one of the slots 624 provided at the sensing housing 620 and an external power connection member 640 fixed by a bolt fastened to the nut 641. The external power connection member 640 may have a metal plate form, similar to the bus bar 610, and may be used for electrically connecting the battery module 10 of the present disclosure to another battery module 10 or connecting to an electrode terminal of a battery pack.

Preferably, the external power connection member 640 may be mounted to the sensing housing 620 by means of the bolt/nut 641 at the sensing housing part 620a located at an end of the sensing housing 620.

The assembling configuration of the external power connection member 640 will be described in more detail. Similar to the assembling method of the bus bar 610 as described above, the nut 641 is partially inserted into the second cut portion 624a of any one sensing housing part 620a, and then another sensing housing part 620a is assembled thereto so that another part of the nut 641 is inserted into the second cut portion 624a of another sensing housing part 620a, thereby confining the nut 641 to two sensing housing parts 620a. After that, a bolt is inserted into the external power connection member 640 and fastened to the nut 641 to fix the external power connection member 640 to the sensing housing 620.

Figure 16:
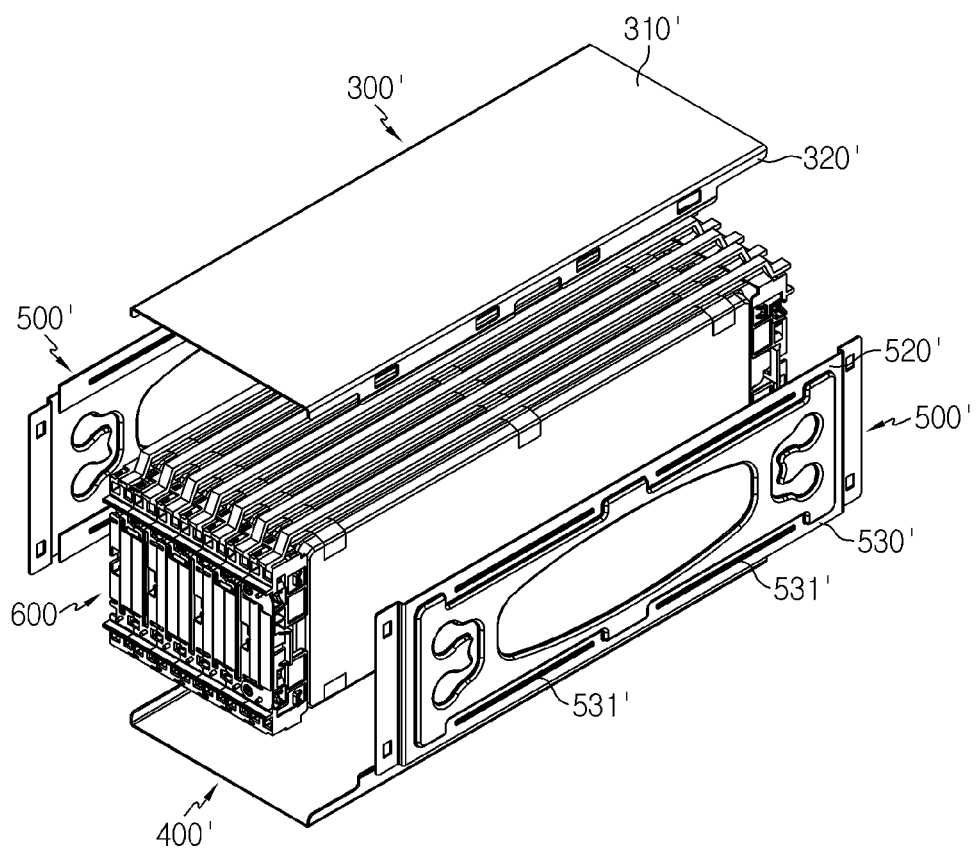
FIG. 16 is a partially exploded perspective view showing a battery module according to another embodiment of the present disclosure, which corresponds to FIG. 2.
Figure 17:
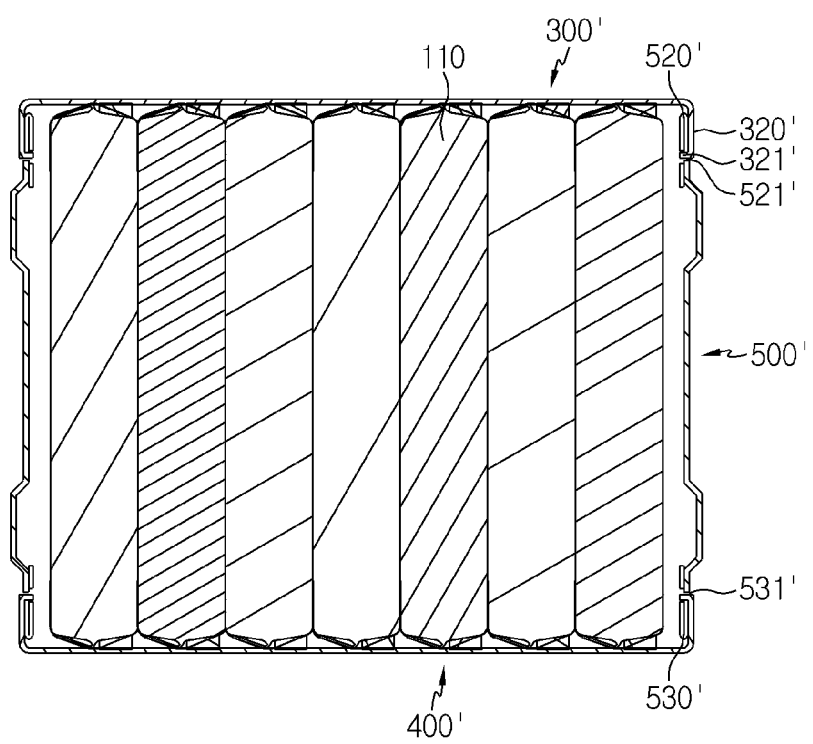
FIG. 17 is a longitudinally sectioned view showing the battery module according to another embodiment of the present disclosure.

FIG. 16 is a partially exploded perspective view showing a battery module according to another embodiment of the present disclosure, which corresponds to FIG. 2, and FIG. 17 is a longitudinally sectioned view showing the battery module according to another embodiment of the present disclosure.

Subsequently, a battery cell pressurizing end plate assembling structure of a battery module according to another embodiment of the present disclosure will be described with reference to FIGS. 16 and 17. The feature identical to that of the former embodiment will not be described in detail, but features different from the former embodiment will be described in detail.

This embodiment is different from the former embodiment in the assembling structure of top and bottom plates 300', 400' and a pair of side plates 500'. In other words, in this embodiment, the pair of side plates 500' are coupled to both ends of the top and bottom plates 300', 400' by fitting.

The top and bottom plates 300', 400' of this embodiment may include a horizontal portion 310' forming a horizontal surface, vertical portions 320' vent vertically at both ends of the horizontal portion 310', and insert portions 321' bent at ends of the vertical portions 320' toward the battery cells 110, respectively. In addition, the pair of side plates 500' may include plate holes 521', 531', respectively, so that the insert portion 321' is inserted into the edge regions 520', 530' of the top and bottom ends.

For example, as shown in FIG. 17, the top plate 300' and the top edge region 520' of the pair of side plates 500' may be coupled by fitting both ends of the top plate 300', namely the left and right insert portion 321' of the top plate, into the plate holes 521' of the left and right side plates 500'. In the same way, the bottom plate 400' may also be coupled to the bottom edge region 530' of the pair of side plates 500'.

According to this configuration, in the battery module according to this embodiment, since the pair of side plates 500' are fastened between both ends of the top and bottom plates 300', 400', the battery cells 110 may be compressed between the side plates 500' even in case of emergency, thereby preventing swelling. In particular, in this embodiment, easy assembling is ensured, similar to the former embodiment where the clinching coupling structure is applied, and also a stronger coupling force is provided in comparison to the former embodiment. For example, when the expansion force of the battery cells 110 is invincible at swelling, in the former embodiment, the clinching may be released, but in this embodiment, the fitting structure is substantially not released as long as the coupling portion is not broken.

Meanwhile, a battery pack according to the present disclosure may include at least one battery module 10 according to the present disclosure. In addition, the battery pack according to the present disclosure may further include a pack case for accommodating the battery module 10 and various devices for controlling charging/discharging of the battery module 10, such as BMS, a current sensor, a fuse and the like, in addition to the battery module 10.

The battery module 10 according to the present disclosure may be applied to vehicles such as electric vehicles and hybrid electric vehicles or power storage devices (ESS).

Even though the present disclosure has been described based on the limited embodiments and drawings, it should be understood that the present disclosure is not limited thereto, but various changes and modifications can be made within the scope of the appended claims by those skilled in the art.

Meanwhile, when the terms indicating up, down, left and right directions are used in the specification, it is obvious to those skilled in the art that these terms are selected merely for convenience in explanation and may vary based on a location of a target or an observer.

What is claimed is:

1. A battery module, comprising:
   a cell assembly comprising a plurality of pouch-type battery cells having side surfaces stacked in a first direction;
   a pair of elastic buffer pads, one of the pair of buffer pads disposed at each side surface of the cell assembly;
   a top plate and a bottom plate configured to cover a top and a bottom of the cell assembly, respectively;
   a pair of side plates coupled to both ends of the top plate and the bottom plate by clinching or fitting so that the pair of buffer pads and the cell assembly are interposed between the pair of side plates;
   a sensing assembly disposed to at least one of a front surface and a rear surface of the cell assembly to electrically connect electrode leads protruding at each of the pouch-type battery cells,
   wherein the sensing assembly includes:
   a bus bar electrically connected to the electrode leads; and
   a sensing housing having a front surface to which the bus bar is mounted, the sensing housing including a plurality of sensing housing parts that are releasably connected to each other and successively assembled in the first direction and allow the electrode leads to pass through a body of the sensing housing toward the bus bar.

2. The battery module according to claim 1, wherein each of the pair of side plates includes a bead portion formed by a depression in an exterior surface to have a reduced thickness, and
   wherein each of the pair of buffer pads has one surface with a shape corresponding to the bead portion.

3. The battery module according to claim 2, wherein the bead portion includes a first oval bead portion provided at a center region of the side plate and a second V-shaped bead portion separately provided at a left side region and a right side region of the side plate with respect to the first bead portion and having a smaller area and a smaller depth than the first bead portion.

4. The battery module according to claim 1, wherein each of the top plate and the bottom plate includes a horizontal portion forming a horizontal surface and vertical portions bent vertically at both sides of the horizontal portion, and
   wherein an edge region of a top end and an edge region of a bottom end of each of the pair of side plates are coupled to the vertical portion of the top plate and the vertical portion of the bottom plate by clinching, respectively.

5. The battery module according to claim 4, wherein each of the pair of side plates have clinching protrusions protruding at the edge region of the top end and the edge region of the bottom end, and the top plate and the bottom plate each have clinching holes formed at the vertical portions coupled with the clinching protrusions by fitting.

6. The battery module according to claim 4, wherein the edge region of the top end and the edge region of the bottom end of each of the pair of side plates are disposed to overlap at an inner side of the vertical portion of the top plate and the vertical portion of the bottom plate, respectively.

7. The battery module according to claim 1, wherein the plurality of sensing housing parts are provided in a number corresponding to a number of the pouch-type battery cells.

8. The battery module according to claim 1, wherein each of the plurality of sensing housing parts has a convex protrusion and a concave groove corresponding to each other and are mutually assembled by fitting in a block coupling manner.

9. The battery module according to claim 1, wherein the sensing housing is fit into one side end of each of the pair of side plates and is supported by the pair of side plates to be spaced apart from the plurality of pouch-type battery cells by a predetermined distance.

10. The battery module according to claim 1, wherein the bus bar includes a plate portion having a plate form contacted to the electrode leads and a terminal bending portion bent from one end of the plate portion, and
wherein the sensing housing has a slit through which at least a part of the bus bar passes and a slot forming an inner space for accommodating the terminal bending portion, the slit and the slot being formed by assembling a first sensing housing part and a second sensing housing part.

11. The battery module according to claim 10, wherein the sensing assembly further includes a voltage sensing receptacle terminal inserted into the slot and provided to be electrically connectable to the terminal bending portion of the bus bar.

12. The battery module according to claim 10, wherein a nut is accommodated in any one of the slots provided in the sensing housing, and the sensing assembly further includes an external power connection member fixed by a bolt fastened to the nut.

13. The battery module according to claim 1, wherein each of the top plate and the bottom plate includes a horizontal portion forming a horizontal surface, vertical portions bent vertically at both ends of the horizontal portion, and insert portions bent at ends of the vertical portions toward the cell assembly, and
wherein each of the pair of side plates has a plate hole formed at an edge region of a top end and an edge region of a bottom end thereof so that the insert portion is fit therein.

14. The battery module according to claim 1, wherein each of the buffer pads has a thickness determined by the following equation:

$$T = A/2 + B$$

where T: thickness of the buffer pad, A: the number of battery cells×maximum displacement of the battery cells at swelling, B: thickness of the buffer pad at maximum compression.

15. The battery module according to claim 1, wherein each of the buffer pads is made of foam.

16. The battery module according to claim 1, wherein each sensing housing part has a top surface, a bottom surface and side surfaces, and
wherein the side surfaces of the plurality of sensing housing parts have mating connectors to attach the plurality of sensing housing parts to each other.

* * * * *